United States Patent
Hiromitsu et al.

(10) Patent No.: US 11,460,574 B2
(45) Date of Patent: *Oct. 4, 2022

(54) COLLISION DETERMINATION APPARATUS AND COLLISION DETERMINATION METHOD

(71) Applicants: DENSO CORPORATION, Kariya (JP); TOYOTA JIDOSHA KABUSHIKI KAISHA, Toyota (JP)

(72) Inventors: Takayuki Hiromitsu, Kariya (JP); Shinji Kitaura, Kariya (JP); Akihiro Kida, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 532 days.

This patent is subject to a terminal disclaimer.

(21) Appl. No.: 16/461,154

(22) PCT Filed: Oct. 30, 2017

(86) PCT No.: PCT/JP2017/039081
§ 371 (c)(1),
(2) Date: May 15, 2019

(87) PCT Pub. No.: WO2018/092566
PCT Pub. Date: May 24, 2018

(65) Prior Publication Data
US 2020/0064464 A1 Feb. 27, 2020

(30) Foreign Application Priority Data
Nov. 17, 2016 (JP) .............................. JP2016-224530

(51) Int. Cl.
*G01S 13/931* (2020.01)
*B60W 30/095* (2012.01)
(Continued)

(52) U.S. Cl.
CPC ....... *G01S 13/931* (2013.01); *B60W 30/0953* (2013.01); *G01S 7/415* (2013.01);
(Continued)

(58) Field of Classification Search
CPC .. G08G 1/16; B60W 30/095; B60W 30/0956; B60W 30/0953; B60W 2554/80;
(Continued)

(56) References Cited

U.S. PATENT DOCUMENTS 5,191,346 A * 3/1993 Avignon ................. F41G 7/222
342/61
5,402,129 A * 3/1995 Gellner ................. G01S 13/348
342/70
(Continued)

FOREIGN PATENT DOCUMENTS

JP 2007-317018 A 12/2007
WO 2010/73292 A1 7/2010

*Primary Examiner* — Erin F Heard
*Assistant Examiner* — Michael W Justice
(74) *Attorney, Agent, or Firm* — Maschoff Brennan

(57) ABSTRACT

A collision determination apparatus includes an acquisition section, a filtering section, a target object information detection section, a target object path prediction section, an own vehicle path prediction section, a collision determination section, and a vehicle control section. The acquisition section (21) acquires detection information based on a reflected wave from a search device. The filtering section filters the detection information. The target object information detection section detects a position of a target object using the filtered detection information. The target object path prediction section predicts a path of the target object based on changes in the detected position of the target object. The own vehicle path prediction section predicts a path of an own vehicle. The collision determination section determines a risk of collision between the own vehicle and the target object. The vehicle control section executes a vehicle con- (Continued)

trol. The path of the target object is predicted based on the detection information filtered by a collision determination filter. The path of the target object is predicted based on the detection information filtered by a vehicle control filter. The filtering process is a smoothing process that inhibits changes in the detection information. The vehicle control filter and the collision determination filter have different smoothing degree of inhibiting the changes in the detection information.

7 Claims, 7 Drawing Sheets

(51) Int. Cl.
  *G01S 7/41* (2006.01)
  *G01S 13/50* (2006.01)
(52) U.S. Cl.
  CPC ........ *G01S 13/50* (2013.01); *B60W 2554/801* (2020.02); *G01S 2013/932* (2020.01)
(58) Field of Classification Search
  CPC ........ G01S 13/93; G01S 13/931; G01S 13/58; G01S 13/50; G01S 2013/932
  USPC ................................ 701/301, 1, 41; 342/173
  See application file for complete search history.

(56) References Cited

U.S. PATENT DOCUMENTS

| | | | | |
|---|---|---|---|---|
| 5,659,318 | A * | 8/1997 | Madsen | G01S 13/9023 342/25 C |
| RE36,819 | E * | 8/2000 | Gellner | G01S 13/348 342/70 |
| 7,124,027 | B1 * | 10/2006 | Ernst, Jr. | G01S 13/931 701/301 |
| 7,903,024 | B2 * | 3/2011 | Tietjen | G01S 13/28 342/162 |
| 7,911,375 | B2 * | 3/2011 | Winstead | G01C 5/005 342/99 |
| 8,102,308 | B2 * | 1/2012 | Tsunekawa | G08G 1/166 342/107 |
| 9,811,732 | B2 * | 11/2017 | Sundaresan | G06V 10/42 |
| 10,586,102 | B2 * | 3/2020 | Ren | G06V 10/44 |
| 2009/0109083 | A1 * | 4/2009 | Tietjen | G01S 13/5246 342/162 |
| 2010/0302088 | A1 * | 12/2010 | Winstead | G01S 13/882 342/120 |
| 2011/0175767 | A1 * | 7/2011 | Tsunekawa | G01S 13/931 342/107 |
| 2016/0267325 | A1 * | 9/2016 | Sundaresan | G06V 10/40 |
| 2017/0053167 | A1 * | 2/2017 | Ren | G06T 3/40 |

* cited by examiner

FIG.5
(a)
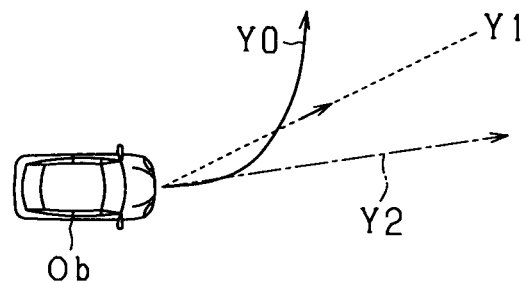
(b)
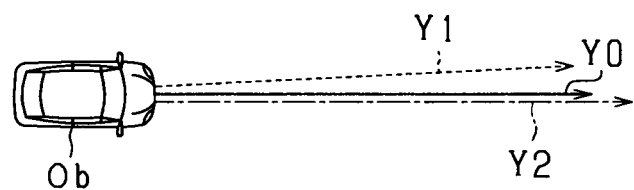

FIG.8
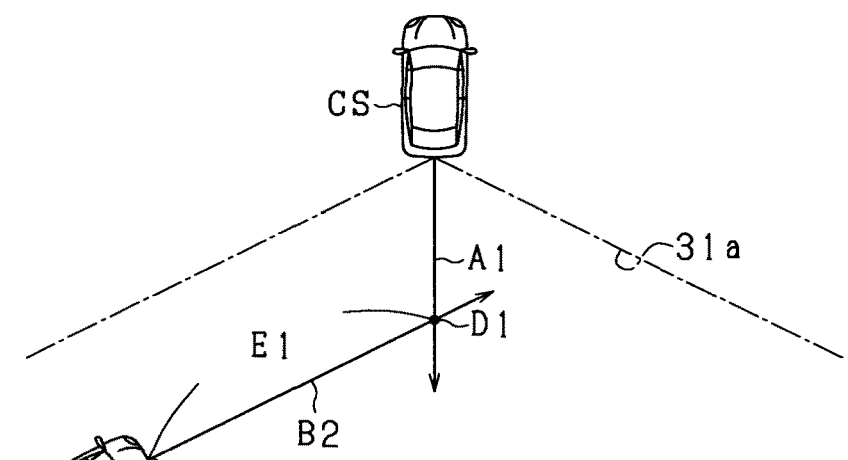
(a)
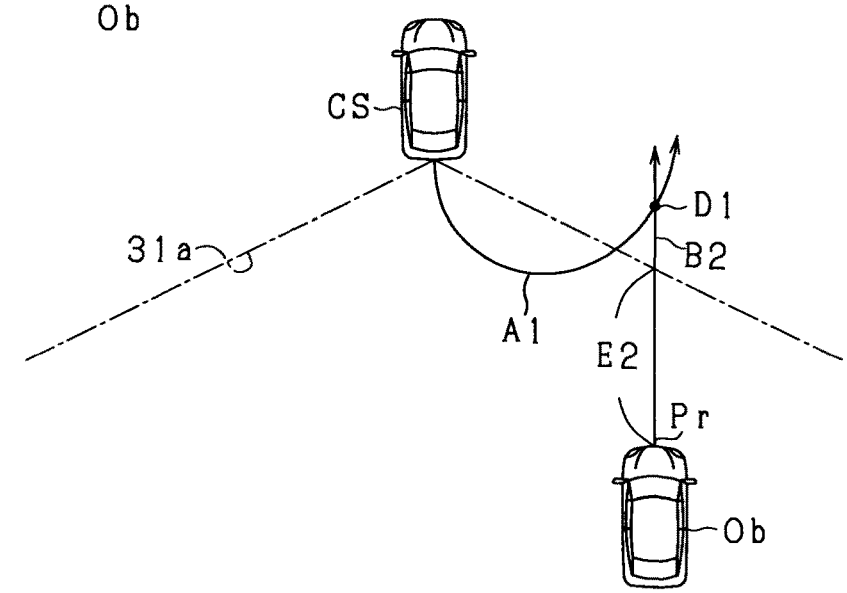
(b)
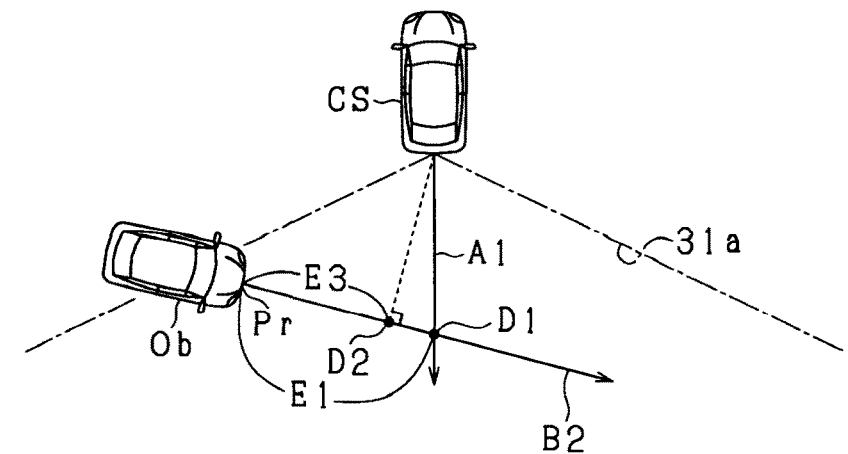
(c)

COLLISION DETERMINATION APPARATUS AND COLLISION DETERMINATION METHOD

CROSS-REFERENCE TO RELATED APPLICATION

This application is the U.S. national phase of International Application No. PCT/JP2017/039081 filed Oct. 30, 2017 which designated the U.S. and claims priority to Japanese Patent Application No. 2016-224530 filed Nov. 17, 2016, the contents of which are incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to a collision determination apparatus that determines a risk of collision between the own vehicle and a target object and to a collision determination method.

BACKGROUND ART

Conventionally, collision determination apparatuses have been proposed that determines a risk of collision between the own vehicle and a target object to ensure the traveling safety of vehicles (for example, PTL 1). In PTL 1, a system ECU acquires the behavior (traveling condition) of the own vehicle from, for example, a vehicle speed sensor and predicts a path of the own vehicle. A radar ECU detects the position of another vehicle (target object) using a millimeter-wave radar and predicts the path of the other vehicle based on changes in the position. The system ECU makes a determination of a collision based on the predicted path of the own vehicle and the predicted path of the other vehicle. If it is determined that a collision will occur, the system ECU executes a vehicle control such as applying brakes to the vehicle. This ensures the traveling safety of the vehicle.

CITATION LIST

Patent Literature

[PTL 1] Japanese Laid-Open Patent Publication No. 2007-317018

SUMMARY OF THE INVENTION

The millimeter-wave radar detects the position of the target object based on a reflected wave from the other vehicle, which serves as the target object. Thus, when the path of the target object is predicted based on the detection information from the millimeter-wave radar, the path may possibly be predicted erroneously due to the influence of unwanted reflected waves reflected off, for example, vehicles other than the target object. Given these factors, to reduce the influence of the unwanted reflected waves, the detection information is filtered (smoothed) using, for example, a low-pass filter to appropriately predict the path.

However, there is a possibility that unnecessary vehicle control may be performed, or a necessary vehicle control may not be performed depending on the filter characteristics. More specifically, if the filter characteristics are made strong (if the smoothing degree is increased), while the influence of the unwanted reflected waves is decreased, the response to the movement of the target object is hindered. That is, while the stability is improved, the responsiveness deteriorates. Thus, if the target object abruptly changes the traveling direction, there may be a deviation from the predicted path. In this case, the collision determination becomes difficult, and the vehicle control is hindered from being executed at an appropriate point in time.

If the filter characteristics are made weak (if the smoothing degree is reduced), the response to the movement of the target object is improved, but the influence of the unwanted reflected waves is also increased. That is, while the response is improved, the stability deteriorates. As a result, there may be a deviation from the actual path due to the influence of the unwanted reflected waves. In this case also, the collision determination becomes difficult, and the vehicle control is hindered from being executed at an appropriate point in time.

As described above, since the responsiveness to the path and the stability are incompatible, it is difficult to set the points in time for making a determination of a collision and performing the vehicle control. Consequently, there is a possibility that an unnecessary vehicle control is performed or a necessary vehicle control is not performed.

The present disclosure has been accomplished in view of the above circumstances and mainly aims at providing a collision determination apparatus and a collision determination method that appropriately set filter characteristics.

To address the above problem, the present disclosure is configured as follows.

The collision determination apparatus of the present disclosure includes an acquisition section, a filtering section, a target object information detection section, a target object path prediction section, an own vehicle path prediction section, a collision determination section, and a vehicle control section. The acquisition section acquires detection information from a search device, which transmits search waves and receives reflected waves reflected from a target object. The detection information is based on the reflected wave. The filtering section filters the detection information. The target object information detection section detects a position of the target object using the filtered detection information. The target object path prediction section predicts a path of the target object based on changes in the position of the target object detected by the target object information detection section. The own vehicle path prediction section predicts a path of an own vehicle. The collision determination section determines a risk of collision between the own vehicle and the target object based on whether the path of the target object and the path of the own vehicle intersect with each other. If it is determined that the own vehicle will collide with the target object, the vehicle control section estimates a point in time at which the target object will collide with the own vehicle based on the path of the target object and the path of the own vehicle and executes a vehicle control. The path of the target object used by the collision determination section is predicted based on the detection information filtered by a collision determination filter. The path of the target object used by the vehicle control section is predicted based on the detection information filtered by a vehicle control filter. The filtering process is a smoothing process that inhibits changes in the detection information. The vehicle control filter and the collision determination filter have a different smoothing degree of inhibiting the changes in the detection information.

With this configuration, in one of the processes of the collision determination and the vehicle control, the path of the target object with a satisfactory response is used, and in the other one of the processes, the path of the target object with satisfactory stability is used. Thus, even if the target object abruptly changes the traveling direction, the influence is reduced when one of the processes of the collision determination and the vehicle control is performed. Similarly, even if unwanted reflected waves are received, the influence is reduced when one of the processes of the collision determination and the vehicle control is performed.

As above, even if the target object abruptly changes the traveling direction or unwanted reflected waves are received, the influence is reduced by appropriately setting the filter characteristics. Consequently, cases in which unnecessary vehicle control is performed and in which necessary vehicle control is not performed are reduced.

BRIEF DESCRIPTION OF THE DRAWINGS

The above-mentioned object, other objects, features, and advantages of the present disclosure will become apparent from the following detailed description, taken in conjunction with the accompanying drawings. In the accompanying drawings:

FIGS. 5(a) and 5(b) are diagrams showing the relationship between the filter characteristics and the path of the target object;

FIGS. 8(a) to 8(c) are diagrams showing a detectable distance; and

DESCRIPTION OF EMBODIMENTS

First Embodiment

Figure 1:
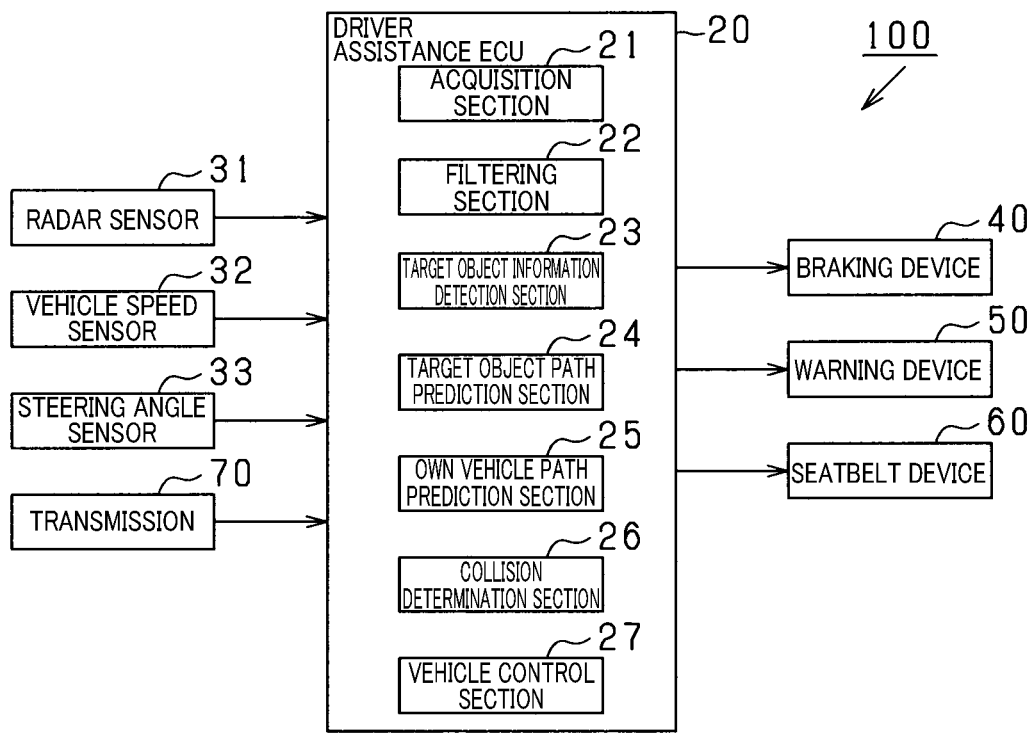
FIG. 1 is a block diagram of a pre-crash safety system (PCSS)

Hereinafter, an embodiment of the present disclosure will be described with reference to the drawings. In each of the following embodiments, identical or the same components are given identical reference numerals in the drawings.

FIG. 1 shows a pre-crash safety system (hereinafter, referred to as the PCSS) 100. The PCSS 100 is one example of a vehicle system mounted on a vehicle and detects an object located around the vehicle. If there is a possibility that the detected object will collide with the vehicle, the PCSS 100 executes an operation to avoid a collision of the own vehicle with the object or an operation to ease the collision (PCS operation). Hereinafter, the vehicle on which the PCSS 100 is mounted will be referred to as the own vehicle CS, and the object that is the subject of detection will be referred to as a target object Ob.

The PCSS 100 shown in FIG. 1 includes various sensors, a driver assistance ECU 20, a braking device 40, a warning device 50, a seatbelt device 60, and a transmission 70. In the embodiment shown in FIG. 1, the driver assistance ECU 20 functions as a collision determination apparatus and executes a collision determination method.

Various sensors are connected to the driver assistance ECU 20 and output detection information of the target object Ob and the vehicle information of the own vehicle CS to the driver assistance ECU 20. In FIG. 1, various sensors include a search device, which is a radar sensor 31, a vehicle speed sensor 32, and a steering angle sensor 33.

The radar sensor 31 is, for example, a known millimeter-wave radar, which transmits a high-frequency signal in a millimeter-wave band. The radar sensor 31 is located at, for example, the rear end section of the own vehicle CS. The region in a predetermined detection angle $\alpha$ is referred to as a detection range 31a. The radar sensor 31 detects the position of the target object Ob in the detection range 31a. More specifically, the radar sensor 31 transmits search waves in a predetermined cycle and receives reflected waves with multiple antennas. The distance between the own vehicle CS and the target object Ob is calculated based on the point in time when the search wave is transmitted and the point in time when the reflected wave is received. Furthermore, the relative speed is calculated based on the frequency of the reflected wave reflected off the target object Ob and changed due to the Doppler effect. Additionally, the direction of the target object Ob is calculated based on the phase difference between the reflected waves received by the antennas. When the distance and the direction between the own vehicle CS and the target object Ob are calculated, the relative position of the target object Ob with respect to the own vehicle CS is determined.

The radar sensor 31 transmits a search wave, receives a reflected wave, calculates the distance, calculates the direction, and calculates the relative speed at every predetermined cycle. The radar sensor 31 outputs the distance between the own vehicle CS and the target object Ob, the direction of the target object Ob, and the relative speed that have been calculated to the driver assistance ECU 20 as radar detection information. The radar sensor 31 may calculate the relative position of the target object Ob and output as the radar detection information.

The vehicle speed sensor 32 detects the current vehicle speed of the own vehicle CS. The detected vehicle speed is input to the driver assistance ECU 20. The steering angle sensor 33 detects the steering angle of the steering wheel (or the tires). The detected steering angle is input to the driver assistance ECU 20.

The braking device 40 includes a brake mechanism, which changes the braking force of the own vehicle CS, and a brake ECU, which controls the operation of the brake mechanism. The brake ECU is connected to the driver assistance ECU 20 to be able to communicate with each other and is controlled by the driver assistance ECU 20 to control the brake mechanism. The brake mechanism includes, for example, a master cylinder, wheel cylinders, which apply a braking force to the wheels (tires), and an ABS actuator, which adjusts the distribution of the pressure (hydraulic pressure) from the master cylinder to the wheel cylinders. The ABS actuator is connected to the brake ECU and is controlled by the brake ECU to adjust the hydraulic pressure from the master cylinder to the wheel cylinders. This adjusts the operation amount with respect to the wheels (tires).

The warning device 50 is controlled by the driver assistance ECU 20 to warn a driver of the existence of the target object Ob approaching the rear of the own vehicle. The warning device 50 is configured by, for example, a speaker provided in a passenger compartment or a display showing an image.

The seatbelt device 60 includes seatbelts on the seats of the own vehicle and pretensioners, which retract the seatbelts. The seatbelt device 60 performs the preparatory operation of the retraction of the seatbelts as the PCS operation when the possibility that the own vehicle CS collides with the target object Ob is increased. If the collision is unavoidable, each seatbelt is retracted to remove the slack, so that an occupant such as the driver is fastened to the seat, and the occupant is protected.

The transmission 70 sets the shift position of the own vehicle CS when, for example, a non-illustrated shift lever is operated by the driver. The shift position at least includes, for example, an R position (reverse), which is a position indicating a state in which the own vehicle CS moves backward, and a D position (drive), which is a position indicating a state in which the own vehicle CS moves forward. The shift position further includes an N position (neutral) and a P position (parking). The information indicating the shift position is input to the driver assistance ECU 20.

The driver assistance ECU 20 is configured as a known microcomputer including a Central Processing Unit (CPU), a Read Only Memory (ROM), and a Random Access Memory (RAM) and executes the vehicle control for the own vehicle CS by referring to the computation programs and the control data in the ROM. In the present embodiment, the driver assistance ECU 20 executes the PCS operation when the own vehicle CS is moving backward, that is, when the shift position is in the R position. More specifically, when the shift position is in the R position, the driver assistance ECU 20 acquires the radar detection information from the radar sensor 31 and detects the position of the target object Ob based on the acquired radar detection information. The driver assistance ECU 20 executes the PCS operation based on the detection result with at least one of the devices 40, 50, and 60 serving as the subject of control. In executing the PCS operation, the driver assistance ECU 20 executes programs stored in the ROM to function as an acquisition section 21, a filtering section 22, a target object information detection section 23, a target object path prediction section 24, an own vehicle path prediction section 25, a collision determination section 26, and a vehicle control section 27. Each of the functions will be described below.

The acquisition section 21 acquires the radar detection information input from the radar sensor 31 at every predetermined cycle (for example, 80 ms). The radar detection information includes the position information indicating a position Pr of the target object Ob. The acquisition section 21 also acquires information indicating the vehicle speed of the own vehicle CS from the vehicle speed sensor 32 and acquires information indicating the steering angle from the steering angle sensor 33. Furthermore, the acquisition section 21 acquires information indicating the shift position from the transmission 70.

The filtering section 22 filters the radar detection information acquired by the acquisition section 21. The filtering process is, for example, a smoothing process that inhibits changes in the radar detection information. More specifically, the filtering process is a process that eases the abrupt change in the information included in the radar detection information (such as the direction, the distance, the relative speed, or the relative position of the target object Ob) from the information included in the previous radar detection information through the filter, or a process to separate the information that has abruptly changed through the filter. The filtering process inhibits the abrupt change in the position Pr of the target object Ob detected based on the radar detection information. That is, the filtering process inhibits (smooths) the abrupt change in the position Pr of the target object Ob from the previously detected positions Pr of the target object Ob. The filtering process reduces or removes the influence of unwanted reflected waves from objects other than the target object Ob. For example, the filtering process includes a low-pass filtering process that removes the radar detection information based on the reflected waves in a high-frequency band using a low-pass filter.

The target object information detection section 23 detects the position Pr of the target object Ob based on the radar detection information filtered by the filtering section 22. More specifically, the target object information detection section 23 detects the position Pr on a coordinate system with the own vehicle CS at the origin of coordinates based on the distance between the own vehicle CS and the target object Ob and the direction included in the radar detection information. In this coordinate system, the X-axis is set in the vehicle width direction of the own vehicle CS, and the Y-axis is set in the traveling direction of the own vehicle CS. The origin is, more specifically, set at the midpoint between the rear wheels of the own vehicle CS. Thus, the relative position of the target object Ob with respect to the own vehicle CS is detected. The lateral direction orthogonal to the traveling direction (Y-axis direction) is a vehicle width direction (X-axis direction). Furthermore, when the radar detection information includes the relative position of the target object Ob, the relative position of the target object Ob may be acquired and provided as the detection result. The position Pr of the target object Ob is stored in the historical information.

Figure 2:
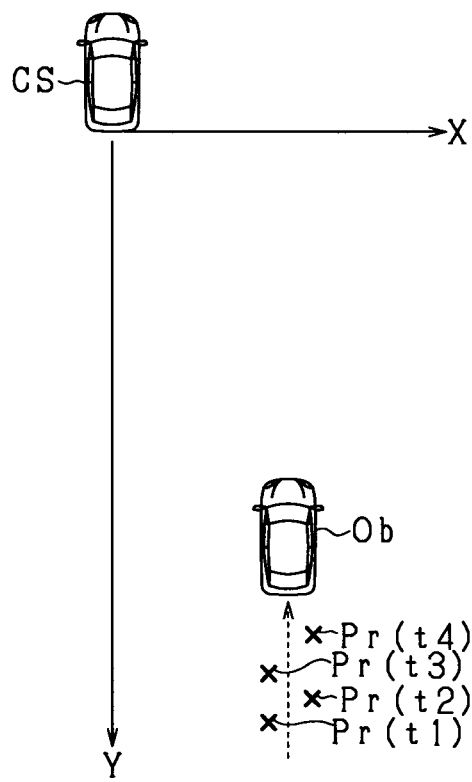
FIG. 2 is a diagram showing the path of a target object.

The target object path prediction section 24 predicts a path of the target object Ob based on changes in the position Pr stored as the historical information. For example, the moving direction vector of the target object Ob is calculated as the path of the target object Ob. FIG. 2 shows the positions Pr of the vehicle, which is detected as the target object Ob, at each point in time from a point in time t1 to a point in time t4 and the path of the target object Ob calculated based on the positions Pr. The point in time t4 is the latest position Pr of the target object Ob stored in the historical information. For example, the target object path prediction section 24 predicts a straight line passing through the position closest to the positions Pr using a known linear interpolation computation, such as the method of least squares, as the path of the target object Ob.

The own vehicle path prediction section 25 predicts a path of the own vehicle CS based on the vehicle speed and the steering angle. For example, the path of the own vehicle CS is predicted by calculating, for example, the turning direction, the turning radius, and the turning center based on the vehicle speed and the steering angle. If the steering angle is 0 degrees, the path of the own vehicle CS is predicted with a straight line, and if the steering angle is other than 0 degrees, the path of the own vehicle CS is predicted with a curved line. The turning direction may be determined based on the steering angle, and the path of the own vehicle CS may be predicted using a straight line along the turning direction. Furthermore, if the vehicle speed is 0 km/h, the own vehicle CS is stopped, and the path of the own vehicle CS is fixed to the current position.

The collision determination section 26 determines a risk of collision between the own vehicle CS and the target object Ob based on the path of the target object Ob and the path of the own vehicle CS that have been predicted. For example, if the path of the target object Ob intersects the path of the own vehicle CS, the collision determination section 26 determines that there is a possibility that the own vehicle CS will collide with the target object Ob.

In determining a risk of collision, the collision determination section 26 may determine whether a collision will occur with consideration given to the width of the own vehicle CS. For example, the collision determination section 26 predicts the path along which the left rear end section of the own vehicle CS (for example, the left rear wheel or the left tail lamp) passes and the path along which the right rear end section (for example, the right rear wheel or the right tail lamp) passes based on the predicted path of the own vehicle CS and the width of the own vehicle CS. The collision determination section 26 may make the determination based on whether one of the predicted paths and the path of the target object Ob intersect with each other. Similarly, the determining a risk of collision may be made with consideration given to the width of the target object Ob.

If it is determined that there is a possibility that a collision will occur, the vehicle control section 27 calculates the distance (predicted distance) to the intersection (predicted collision point) of the path of the target object Ob that has been determined to have the possibility of colliding with the own vehicle CS and the path of the own vehicle CS. The vehicle control section 27 controls the warning device 50, the braking device 40, and the seatbelt device 60 in accordance with the predicted distance to execute the vehicle control, which is the PCS operation.

More specifically, the vehicle control section 27 determines whether the calculated predicted distance is less than or equal to a first distance that has been determined in advance. A first time is a threshold value indicating the starting point in time of the PCS operation and is set to, for example, a value such as 10 m.

If it is determined that the calculated predicted distance is less than or equal to the first distance, the vehicle control section 27 controls the warning device 50 to output an alarm. If the predicted distance is less than or equal to a second distance (for example, 5 m) that is shorter than the first distance, the vehicle control section 27 controls the braking device 40 in addition to the warning device 50 to brake the own vehicle CS. If the predicted distance is less than or equal to a third distance (for example, 1 m) that is shorter than the second distance, the vehicle control section 27 controls the seatbelt device 60 in addition to the warning device 50 and the braking device 40 to retract the seatbelts.

Figure 3:
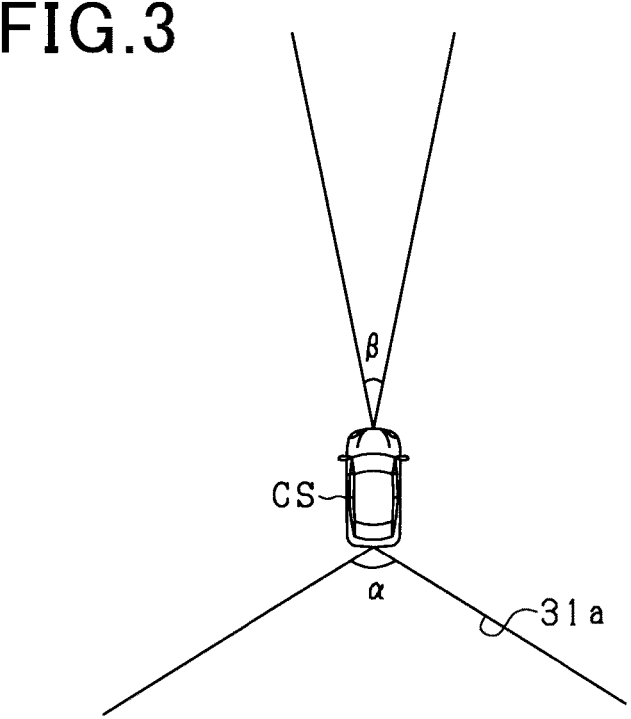
FIG. 3 is a diagram showing a detection range of the radar sensor.

In a case in which a radar sensor is also mounted on the front section of the vehicle, the detection angle α of the radar sensor 31, which is mounted on the rear section of the vehicle, is set to be wider than that of the radar sensor mounted on the front section of the vehicle. More specifically, as shown in FIG. 3, the radar sensor 31 has a detection angle α of about 50 degrees to 140 degrees and sets the range within a distance of about 50 m from the own vehicle CS as the detection range 31a. The radar sensor mounted on the front section of the vehicle often has a detection angle β of about 20 to 30 degrees and sets the range within a distance of about 100 m from the own vehicle CS as the detection range.

The driver assistance ECU 20 acquires the radar detection information from the radar sensor 31, which has the detection range 31a as described above, to detect the position Pr of the target object Ob. Thus, the target object Ob is effectively detected and the determination of a collision is made at the rear of the own vehicle CS where there are many blind spots for a driver.

In particular, when the vehicle is moving backward, for example, the position of another vehicle that travels across the rear of the own vehicle CS from a position diagonally rear of the own vehicle CS is hard to recognize. In a parking lot and like spaces, the own vehicle CS is often moved backward to be parked in or to go out of the parking lot. Since the vehicle speed is low in the parking lot, the steering angle of the vehicle is likely to be increased, and the movement of the vehicle is likely to become irregular. As a result, a case in which another vehicle turns toward the own vehicle CS from a blind spot of the driver occurs more often in a parking lot and like spaces than on a road and like places, and the movement of other vehicles is hard to detect. Thus, increasing the detection angle α of the radar sensor 31 at the vehicle rear and executing the PCS operation when the own vehicle CS is moving backward is particularly useful for the driver.

Figure 4:
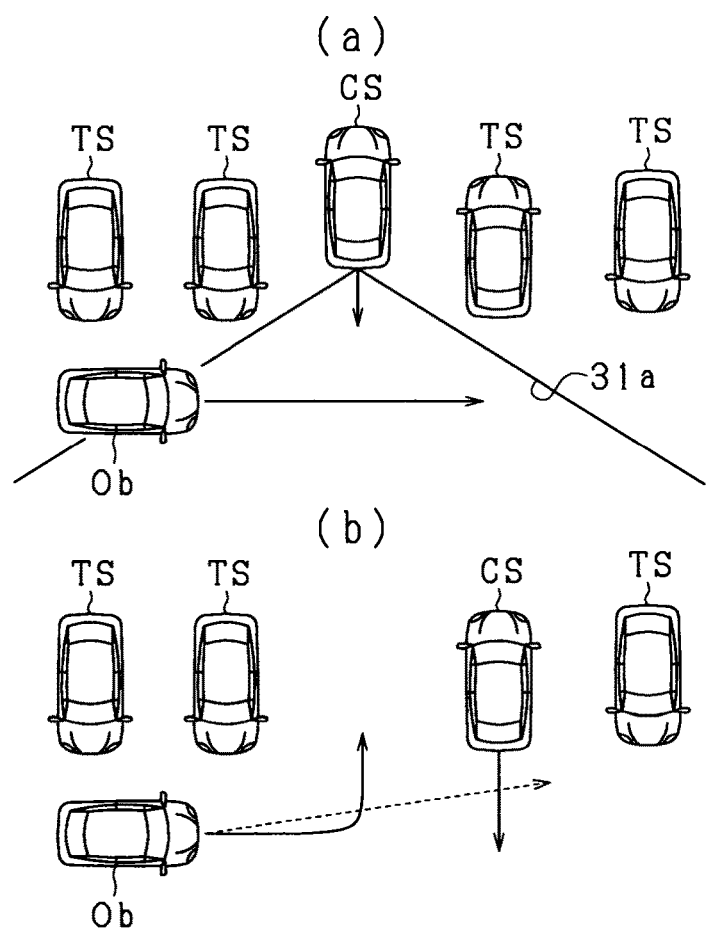
FIGS. 4(a) and 4(b) are diagrams showing situations where a deviation of the path of the target object occurs.

However, when the detection angle α is increased, the possibility that the target object Ob is erroneously detected is increased by the influence of the unwanted reflected waves. The situation in which an erroneous detection occurs may include, for example, the situation shown in FIG. 4(a). FIG. 4(a) shows a situation in which multiple vehicles are parked in a row in a parking lot, and the own vehicle CS is moving backward from the parked position. In this situation, another vehicle, which serves as the target object Ob, moves along the aisle in a direction orthogonal to the traveling direction of the own vehicle CS.

In this case, if the detection angle α of the radar sensor 31 is wide, the position Pr of the target object Ob may be erroneously detected due to the influence of the reflected waves (unwanted reflected waves) from the adjacent stopped vehicles TS. That is, the positions of the stopped vehicles TS around the own vehicle CS may be erroneously detected as the position Pr of the target object Ob. The radar detection information based on such an unwanted reflected wave is often abruptly changed from the previous radar detection information. That is, the target object Ob is erroneously detected often at an unnatural position, for example, at a position out of the previous traveling direction or at a position away from the previous position. This may result in a necessary PCS operation not being executed or an unnecessary PCS operation being executed. Thus, the filtering process is preferably performed so that the changes in the radar detection information are inhibited to reduce the influence of the unwanted reflected waves.

However, if the changes in the radar detection information are always inhibited, a problem possibly arises in a situation where the steering angle (turning angle) of the vehicle, which serves as the target object Ob, is likely to be increased such as in the parking lot. Such a situation includes, for example, the situation shown in FIG. 4(b). FIG. 4(b) shows a situation in a parking lot where the own vehicle CS is about to move backward from the parked position, and a moving vehicle, which serves as the target object Ob moving along the aisle, is about to turn in order to park next to the own vehicle CS.

In this case, if the filtering process is performed to inhibit the changes in the radar detection information, the response to the movement of the target object Ob deteriorates. That is, the position Pr of the target object Ob detected based on the radar detection information may be a position that is retarded from the actually changed position (a position closer to the previous position), or may be removed (ignored) by being separated as the erroneously detected position. Thus, the path of the target object Ob (indicated by a dashed line) is not in conformance with the actual path (indicated by a solid line) and is likely to be predicted to cross the rear of the own vehicle CS, so that it may be determined that a collision will occur in the collision determination, and an unnecessary PCS operation may undesirably be executed.

The path of the target object Ob used by the collision determination section 26 (hereinafter, referred to as the collision determination path B1) is predicted based on the radar detection information filtered by the collision determination filter. The path of the target object Ob used by the vehicle control section 27 (hereinafter, referred to as the vehicle control path B2) is predicted based on the radar detection information filtered by the vehicle control filter. The filter characteristics of the vehicle control filter differ from the filter characteristics of the collision determination filter.

The filter characteristics include the degree of smoothing (the level of the filter) to inhibit the changes in the radar detection information. The greater the smoothing degree of the filter (the stronger the filter characteristics), the more likely the influence of the unwanted reflected waves from objects other than the target object Ob is reduced or removed, and the stability of the position Pr and the path of the target object Ob is improved. That is, the stronger the filter characteristics, the more likely even the radar detection information that is changed little is removed or the radar detection information is eased to reduce the changes in the filtering process. In contrast, the position Pr and the path of the target object Ob are hindered from changing, and the response to the movement of the target object Ob deteriorates.

The smaller the smoothing degree of the filter (the weaker the filter characteristics), the position Pr and the path of the target object Ob become more likely to change, and the response to the movement of the target object Ob is improved. In contrast, the filtering process becomes more susceptible to the influence of the unwanted reflected waves from objects other than the target object Ob, and the stability of the position Pr and the path of the target object Ob deteriorates. That is, as the filter characteristics become weaker, even the radar detection information that is changed greatly is not removed, or the change in the radar detection information becomes less likely to be eased. More specifically, in the low-pass filtering process, while narrowing the passband makes the filter characteristics strong, widening the passband makes the filter characteristics weak.

In FIG. 5(*a*), in a case in which the traveling vehicle, which serves as the target object Ob, makes a turn, how the path of the target object Ob is predicted depending on the difference in the filter characteristics will be described in detail. A path Y1 of the target object Ob (indicated by a dashed line) when the filter characteristics are weak is more responsive to an actual path Y0 of the target object Ob (indicated by a solid line) compared with a path Y2 of the target object Ob (indicated by a long dashed short dashed line) when the filter characteristics are strong. That is, if the filter characteristics are weak, the predicted path Y1 of the target object Ob is likely to be in conformance with the turning direction in response to the turning of the target object Ob. If the filter characteristics are strong, even if the target object Ob makes a turn, the predicted path Y2 of the target object Ob is likely to extend straight ahead.

In contrast, for example, as shown in FIG. 5(*b*), in a case in which the target object Ob goes straight ahead, if the filter characteristics are weak, the position Pr of the target object Ob is likely to be erroneously detected, and the path Y1 is likely to be predicted at a position deviating from the actual path Y0. If the filter characteristics are strong, in a case in which the target object Ob goes straight ahead, the position Pr of the target object Ob is unlikely to be erroneously detected, and the path Y2 is likely to be predicted not to deviate from the actual path Y0.

In the present embodiment, the filtering section 22 performs the filtering process using the collision determination filter and the filtering process using the vehicle control filter on the acquired radar detection information. The filter characteristics of the vehicle control filter are set so that the smoothing degree of inhibiting the changes in the radar detection information is greater than that of the collision determination filter (so that the filter characteristics are made stronger). That is, the collision determination filter has a weaker characteristic than the vehicle control filter.

The target object information detection section 23 detects the position Pr (hereinafter, referred to as the collision determination position P1) of the target object Ob based on the radar detection information filtered using the collision determination filter. The collision determination position P1 is stored in the collision determination historical information. Similarly, the target object information detection section 23 detects the position Pr (hereinafter, referred to as the vehicle control position P2) of the target object Ob based on the radar detection information filtered using the vehicle control filter. The vehicle control position P2 is stored in the vehicle control historical information.

The target object path prediction section 24 predicts the path (hereinafter, referred to as the collision determination path B1) of the target object Ob based on the changes in the collision determination position P1 stored as the collision determination historical information. Similarly, the target object path prediction section 24 predicts the path (hereinafter, referred to as the vehicle control path B2) of the target object Ob based on the changes in the vehicle control position P2 stored as the vehicle control historical information.

The collision determination section 26 determines a risk of collision between the own vehicle CS and the target object Ob based on the predicted collision determination path B1 and the path of the own vehicle CS. For example, if the collision determination path B1 intersects the path of the own vehicle CS, the collision determination section 26 determines that there is a possibility that the own vehicle CS will collide with the target object Ob.

If it is determined that there is a possibility that a collision will occur, the vehicle control section 27 calculates the distance (predicted distance) to the intersection (predicted collision point) of the vehicle control path B2 of the target object Ob that has been determined to have the possibility of colliding with the own vehicle CS and the path of the own vehicle CS. The vehicle control section 27 controls the warning device 50, the braking device 40, and the seatbelt device 60 in accordance with the predicted distance to execute the PCS operation.

As described above, the filter characteristics of the collision determination filter are weaker than the filter characteristics of the vehicle control filter. Thus, the collision determination path B1 is more responsive to the actual movement of the target object Ob, and even if the target object Ob abruptly turns, the accuracy of the collision determination is improved. Meanwhile, the stability deteriorates, and the influence of the unwanted reflected waves from objects other than the target object Ob is increased in the collision determination. However, the vehicle control path B2 is stable, and the influence of the unwanted reflected waves from objects other than the target object Ob is reduced. Thus, the influence of the unwanted reflected waves from objects other than the target object Ob is reduced in executing the PCS operation.

Figure 6:
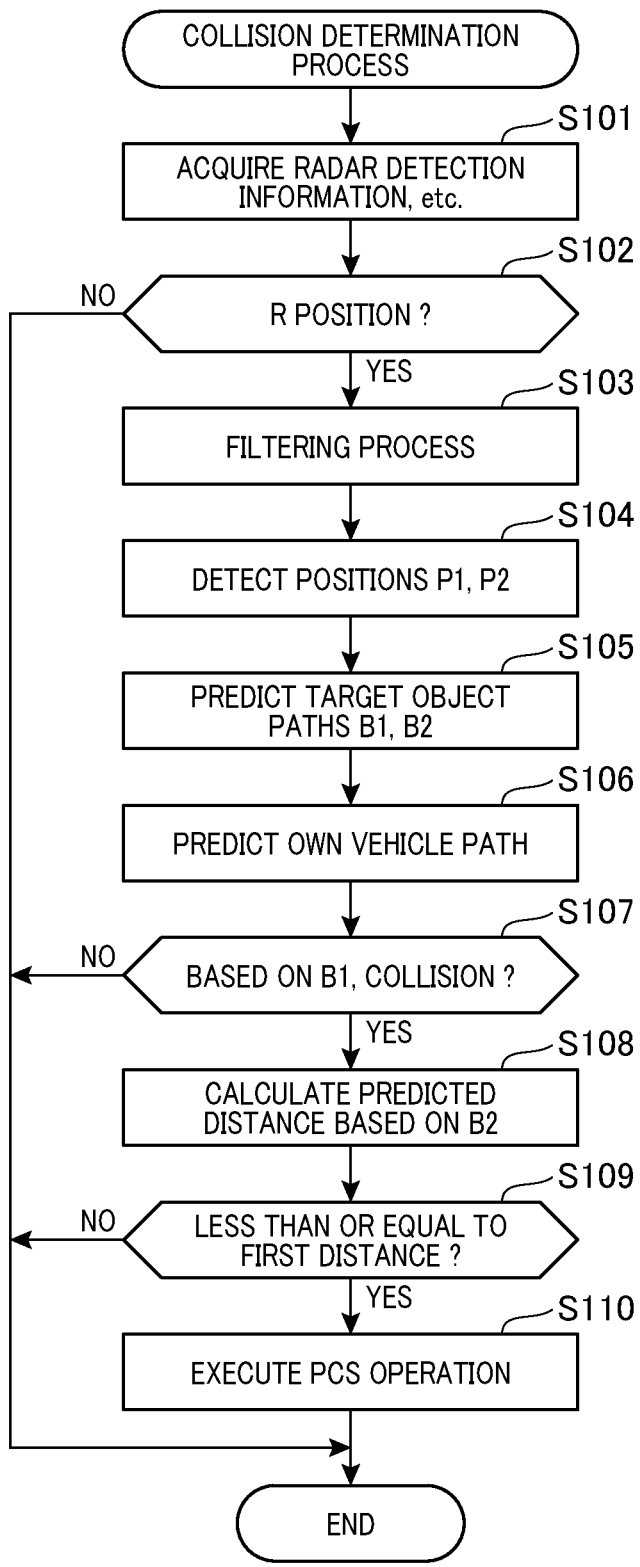
FIG. 6 is a flowchart showing a collision determination process.

The driver assistance ECU 20 executes a collision determination process every predetermined cycle (for example, 80 ms) to execute the PCS operation. The collision determination process will now be described with reference to FIG. 6.

The driver assistance ECU 20 acquires the radar detection information input from the radar sensor 31 (step S101). The driver assistance ECU 20 also acquires information indicating the vehicle speed of the own vehicle CS from the vehicle speed sensor 32 and acquires the information indicating the steering angle from the steering angle sensor 33. The driver assistance ECU 20 also acquires the information indicating the shift position from the transmission 70.

The driver assistance ECU 20 determines whether the R position is selected (step S102). If the R position is not selected (step S102: No), the driver assistance ECU 20 terminates the collision determination process.

If the R position is selected (step S102: Yes), the driver assistance ECU 20 filters the radar detection information (step S103). More specifically, the driver assistance ECU 20 filters the radar detection information using the collision determination filter and acquires the filtered result. At the same time, the driver assistance ECU 20 filters the radar detection information using the vehicle control filter and acquires the filtered result.

When the radar detection information is obtained through the filtering process, the driver assistance ECU 20 detects the position Pr of the target object Ob based on the radar detection information that has been filtered (step S104). More specifically, the driver assistance ECU 20 detects the collision determination position P1 based on the radar detection information filtered using the collision determination filter. The driver assistance ECU 20 stores the collision determination position P1 in the collision determination historical information. The driver assistance ECU 20 also detects the vehicle control position P2 based on the radar detection information filtered using the vehicle control filter. The driver assistance ECU 20 stores the vehicle control position P2 in the vehicle control historical information.

The driver assistance ECU 20 predicts the path of the target object Ob based on the changes in the position Pr stored as the historical information (step S105). More specifically, the driver assistance ECU 20 predicts the collision determination path B1 based on the changes in the collision determination position P1 stored as the collision determination historical information. Similarly, the driver assistance ECU 20 predicts the vehicle control path B2 based on the changes in the vehicle control position P2 stored as the vehicle control historical information.

The driver assistance ECU 20 also predicts the path of the own vehicle CS based on, for example, the steering angle (step S106). Subsequently, the driver assistance ECU 20 determines a risk of collision between the own vehicle CS and the target object Ob based on the predicted collision determination path B1 and the path of the own vehicle CS (step S107). More specifically, if the collision determination path B1 intersects the path A1 of the own vehicle CS, the driver assistance ECU 20 determines that there is a possibility that the own vehicle CS will collide with the target object Ob. If it is determined that there is no possibility of a collision (step S107: No), the driver assistance ECU 20 terminates the collision determination process.

Furthermore, if it is determined that there is a possibility of a collision (step S107: Yes), the driver assistance ECU 20 determines the intersection (predicted collision point) of the vehicle control path B2 of the target object Ob that has been determined to have the possibility of colliding with the own vehicle CS and the path of the own vehicle CS and calculates the distance (predicted distance) from the own vehicle CS to the predicted collision point (step S108).

Furthermore, the driver assistance ECU 20 determines whether the calculated predicted distance is less than or equal to the first distance that has been determined in advance (step S109). If it is determined that the calculated predicted distance is not less than or equal to the first distance (step S109: No), the driver assistance ECU 20 terminates the collision determination process.

If it is determined that the calculated predicted distance is less than or equal to the first distance (step S109: Yes), the driver assistance ECU 20 controls the warning device 50, the braking device 40, and the seatbelt device 60 in accordance with the predicted distance to execute the PCS operation (step S110). The collision determination process is then terminated. The collision determination method is executed by the driver assistance ECU 20 executing the collision determination process as described above.

With the above configuration, the first embodiment has the following advantages.

The collision determination path B1 used in the collision determination and the vehicle control path B2 used in the execution of the vehicle control are predicted based on the radar detection information filtered using different filters. The filter characteristics of the collision determination filter differ from the filter characteristics of the collision control filter. More specifically, the filter characteristics of the collision determination filter are made weaker than the filter characteristics of the collision control filter.

Thus, the collision determination path B1 with satisfactory response is used when determining a risk of collision, and the vehicle control path B2 with satisfactory stability is used when the PCS (vehicle control) operation is executed. Consequently, even if the target object Ob abruptly changes the traveling direction, the determination of a collision is accurately made. Even if the unwanted reflected waves are received, when the PCS (vehicle control) operation is executed, the influence of the unwanted reflected waves is reduced. As above, cases in which an unnecessary vehicle control is performed and in which a necessary vehicle control is not performed are reduced.

When the predicted distance until the target object Ob collides with the own vehicle CS is less than or equal to the first distance (threshold value), the PCS (vehicle control) operation is performed. Thus, the deviation of the collision determination path B1 and the vehicle control path B2 is corrected until the predicted distance becomes less than the first distance, so that an unnecessary PCS operation is inhibited from being performed.

Second Embodiment

A driver assistance ECU 20 according to the second embodiment differs from the first embodiment in that it includes a filter setting section, which sets the filter characteristics of the vehicle control filter used in the filtering process, and performs an appropriate filtering process in accordance with the situations. The filter setting section will now be described in detail.

Figure 7:
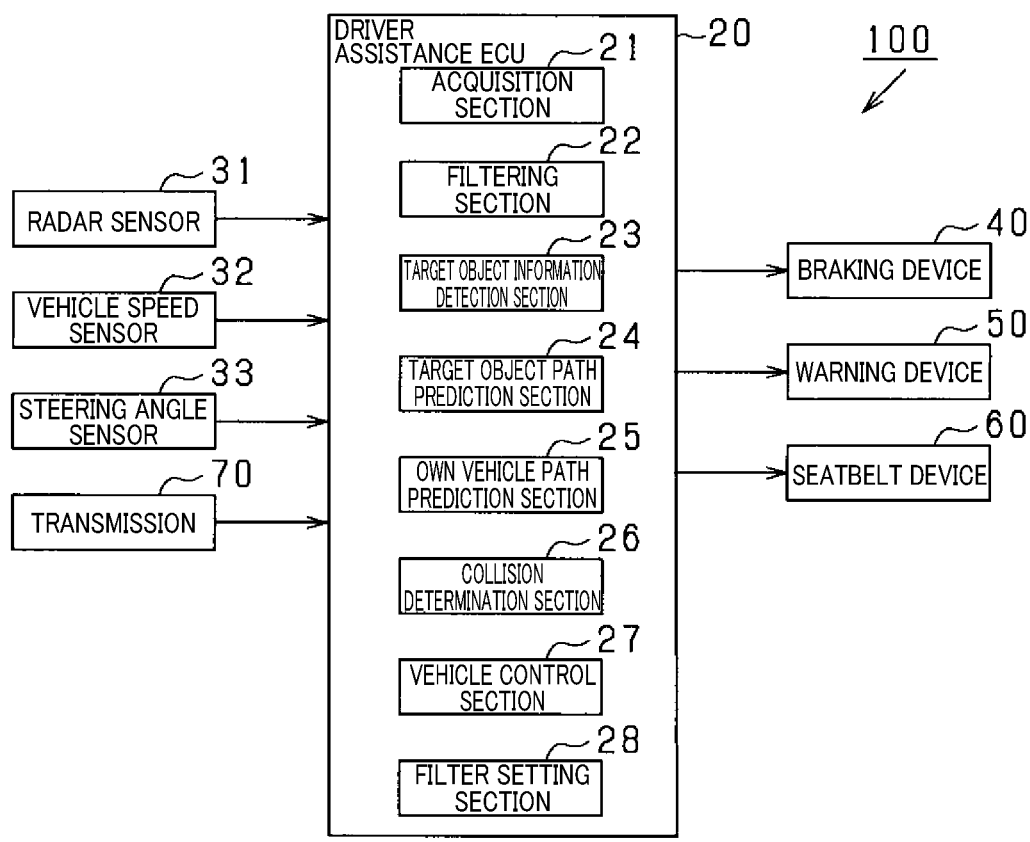
FIG. 7 is a diagram of a PCSS according to a second embodiment.

As shown in FIG. 7, the driver assistance ECU 20 of the second embodiment functions as a filter setting section 28 by executing the program stored in the ROM in executing the PCS operation.

The filter setting section 28 sets the filter characteristics of the vehicle control filter used in the filtering process in the next cycle in accordance with a detectable distance, which is a distance to collision, in which the position Pr of the target object Ob can be detected in the path of the target object Ob. A method for estimating the detectable distance will now be described.

The filter setting section 28 estimates the detectable distance based on the position Pr of the target object Ob and the traveling condition of the own vehicle CS. More specifically, as shown in FIG. 8(*a*), the filter setting section 28 determines the intersection of the vehicle control path B2 predicted by the target object path prediction section 24 and the path A1 of the own vehicle CS predicted by the own vehicle path prediction section 25 as the predicted collision point D1. If the predicted collision point D1 exists in the detection range 31*a* of the radar sensor 31, the filter setting section 28 estimates a distance E1 from the detected vehicle control position P2 of the target object Ob to the predicted collision point D1 as the detectable distance.

The distance E1 may be referred to as a distance until an allowable time or an allowable distance before the point in time at which the own vehicle CS may collide with the target object Ob can be determined. The allowable time is calculated by dividing the distance E1 by the speed of the target object Ob. Furthermore, the distance E1 from the vehicle control position P2 of the target object Ob to the predicted collision point D1 is set as the detectable distance since the vehicle control position P2 of the target object Ob is detectable at least until the own vehicle CS and the target object Ob collide with each other. After the collision, since the path of the target object Ob and the path of the own vehicle CS are affected by the collision, whether the path is detectable is unknown. The detection range 31*a* of the radar sensor 31 is calculated based on the detection angle and the detection distance of the radar sensor 31.

Note that, as shown in FIG. 8(*b*), if the predicted collision point D1 exists outside the detection range 31*a*, the filter setting section 28 estimates a distance E2 from the vehicle control position P2 of the target object Ob to the outermost position of the detection range 31*a* of the radar sensor 31 as the detectable distance.

Furthermore, as shown in FIG. 8(*c*), if an intersection D2 of the vehicle control path B2 of the target object Ob and the transmission direction of the search wave from the radar sensor 31, which are orthogonal to each other, exists in the detection range 31*a*, the filter setting section 28 estimates the shorter one of a distance E3 from the vehicle control position P2 of the target object Ob to the intersection D2 and the distance E1 from the vehicle control position P2 of the target object Ob to the predicted collision point D1 as the detectable distance. The intersection D2 is obtained by drawing a perpendicular line (indicated by a dashed line) from the position of the radar sensor 31 (that is, the position of the own vehicle CS) to the vehicle control path B2. If the intersection D2 exists in the detection range 31*a*, and the predicted collision point D1 does not exist, the filter setting section 28 estimates the distance E3 from the vehicle control position P2 to the intersection D2 as the detectable distance.

This is because even in the detection range 31*a* of the radar sensor 31, a reflected wave from the front of the target object Ob cannot be received after the target object Ob reaches the intersection D2 due to the property of the radar sensor 31, and the vehicle control position P2 of the target object Ob may become unable to be detected. That is, it is because the radar sensor 31 detects the target object Ob based on the reflected wave from the front of the vehicle. For example, as shown in FIG. 8(*c*), when the target object Ob proceeds beyond the intersection D2, the reflected wave from the front of the target object Ob is no longer received, and the vehicle control position P2 of the target object Ob may be lost.

After the estimation of the detectable distance, the filter setting section 28 sets the filter characteristics of the vehicle control filter to be weaker when the estimated detectable distance is long compared with when the estimated detectable distance is short. For example, the filter setting section 28 sets a weak filter so that the filter characteristics of the vehicle control filter become weak if the detectable distance is greater than or equal to a predetermined distance and sets a strong filter so that the filter characteristics of the vehicle control filter become stronger than the weak filter if the detectable distance is less than the predetermined distance. For example, a distance longer than the first distance (for example, 15 m) is set as the predetermined distance with consideration given to the point in time at which the PCS operation is executed.

Two different filters including the strong filter and the weak filter can be set in the present embodiment. Even if either the strong filter or the weak filter is set as the vehicle control filter, the characteristic is stronger than that of the collision determination filter (the smoothing degree is great).

With this configuration, if the detectable distance is greater than or equal to the predetermined distance, the weak filter is set as the vehicle control filter. If the weak filter is set as the vehicle control filter, the response to the actual movement of the target object Ob is improved, and even if the target object Ob abruptly turns, the PCS operation is appropriately executed. Meanwhile, the stability deteriorates, and the influence of the unwanted reflected waves from objects other than the target object Ob is increased. However, the vehicle control position P2 is detected a greater number of times when the detectable distance is long compared with when the detectable distance is short. Thus, more time is allowed for correcting the influence based on the erroneous detection. Also, since the distance E1 from the vehicle control position P2 to the predicted collision point D1 is set as the detectable distance, there is enough distance or time until the PCS operation is executed. Thus, even if there is an influence of the erroneous detection due to setting the weak filter as the vehicle control filter, the influence based on the erroneous detection is expected to be corrected afterward.

Furthermore, if the detectable distance is less than the predetermined distance, the strong filter is set as the vehicle control filter. If the strong filter is set as the vehicle control filter, the stability is improved. Thus, the influence of the unwanted reflected waves from objects other than the target object Ob is reduced, and the PCS operation is appropriately executed.

If the strong filter is set as the vehicle control filter, the response to the movement of the target object Ob deteriorates. However, in a case in which the distance E1 from the vehicle control position P2 to the predicted collision point D1 is set as the detectable distance, if the detectable distance is less than or equal to the predetermined distance, there is a high possibility that the time allowed before the PCS operation is executed is short. Thus, even if the response is poor due to setting the strong filter as the vehicle control filter, the deviation will probably not be great since there isn't much time before the PCS operation is executed. Furthermore, the vehicle control path B2 of the target object Ob is predicted in accordance with the vehicle control position P2 detected in multiple cycles based on the vehicle control historical information. Thus, even if the filter characteristics of the vehicle control filter are made strong, so that the response deteriorates, the deviation is probably reduced by determining the vehicle control path B2 with consideration given to the vehicle control position P2 of the target object Ob when the detectable distance is greater than or equal to the predetermined distance (when the response is satisfactory). As above, even if the target object Ob abruptly turns, the PCS operation is appropriately executed.

If the vehicle control path B2 of the target object Ob and the path A1 of the own vehicle CS do not intersect with each other, the weak filter is set as the vehicle control filter. Thus, it becomes possible to respond to the movement of the target object Ob even if the target object Ob abruptly turns and to appropriately execute the PCS operation. Furthermore, the weak filter is set as the vehicle control filter in the initial state.

Figure 9:
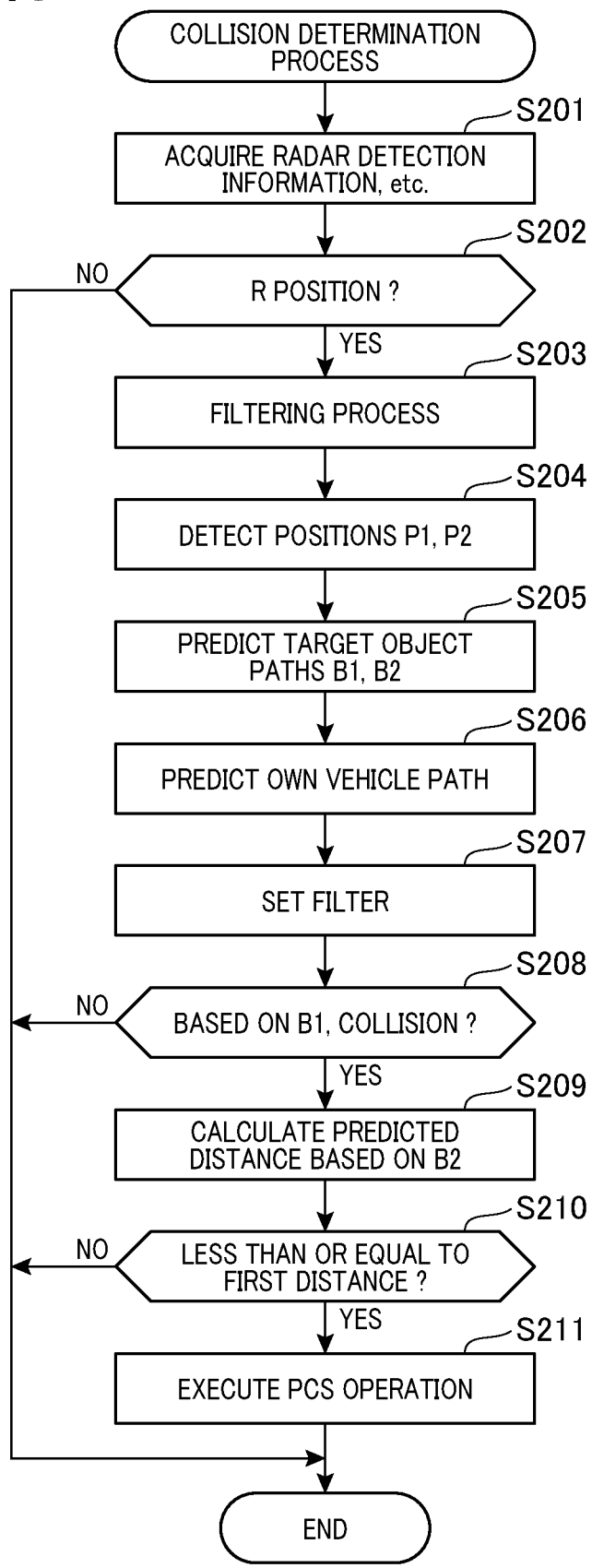
FIG. 9 is a flowchart showing a collision determination process according to the second embodiment.

The driver assistance ECU 20 executes a collision determination process at every predetermined cycle (for example, 80 ms) to execute the PCS operation. The collision determination process according to the second embodiment will now be described with reference to FIG. 9.

The driver assistance ECU 20 acquires, for example, the radar detection information input from the radar sensor 31 (step S201). The driver assistance ECU 20 determines whether the R position is selected (step S202). If the R position is not selected (step S202: No), the driver assistance ECU 20 terminates the collision determination process.

If the R position is selected (step S202: Yes), the driver assistance ECU 20 filters the radar detection information (step S203). More specifically, the driver assistance ECU 20 filters the radar detection information using the collision determination filter and acquires the filtered result. At the same time, the driver assistance ECU 20 filters the radar detection information using the vehicle control filter and acquires the filtered result. At this time, the filter characteristics of the vehicle control filter are the one that is set in the previous cycle. If the filter characteristics of the vehicle control filter are not set in the previous cycle, the filter characteristics are in the initial state (the weak filter).

The driver assistance ECU 20 executes the processes of step S204 to step S206 in the same manner as the processes of step S104 to step S106 in the first embodiment.

Subsequently, the driver assistance ECU 20 estimates the detectable distance and sets the filter characteristics of the vehicle control filter in the next cycle based on the detectable distance (step S207). More specifically, if the detectable distance is greater than or equal to the predetermined distance, the driver assistance ECU 20 sets the filter characteristics of the vehicle control filter to the weak filter characteristics, and if the detectable distance is less than the predetermined distance, the driver assistance ECU 20 sets the strong filter the filter characteristics of which are stronger than the weak filter. In estimating the detectable distance, the driver assistance ECU 20 determines the intersection (the predicted collision point D1) of the vehicle control path B2 of the target object Ob and the path A1 of the own vehicle CS as described above. If the vehicle control path B2 does not intersect the path A1 of the own vehicle CS, the driver assistance ECU 20 sets the weak filter. Subsequently, the driver assistance ECU 20 executes the processes of step S208 to step S211 in the same manner as the processes of step S107 to step S110 of the first embodiment.

With the above configuration, the second embodiment has the following advantages in addition to the advantages of the first embodiment.

The number of times the vehicle control position P2 of the target object Ob is detected is increased when the detectable time or the detectable distance is long compared with when the detectable time or the detectable distance is short. If the number of times the vehicle control position P2 is detected is increased, the vehicle control path B2 of the target object Ob is expected to be corrected. If the vehicle control path B2 is expected to be corrected, the response and the stability desirable in the vehicle control path B2 differ. Thus, the response and the stability desirable in the vehicle control path B2 differ in accordance with the detectable distance in which the vehicle control position P2 can be detected. Given these factors, the driver assistance ECU 20 sets the filter characteristics of the vehicle control filter in accordance with the detectable distance.

That is, the filter characteristics of the vehicle control filter are changed depending on whether the detectable distance is greater than or equal to the predetermined distance. Thus, even if the actual path is abruptly changed, since the filter characteristics of the vehicle control filter are made weak if the detectable distance is greater than or equal to the predetermined distance, the vehicle control path B2 of the target object Ob responds to the actual movement of the target object Ob. Furthermore, even if unwanted reflected waves are input, since the filter characteristics of the vehicle control filter are made strong if the detectable distance is less than the predetermined distance, the vehicle control path B2 of the target object Ob is stabilized. Consequently, the filter characteristics of the vehicle control filter are changed depending on the situations, so that the PCS operation is appropriately executed.

If the filter characteristics of the vehicle control filter are made weak (if the smoothing degree is small), the response is improved. That is, even if the target object Ob abruptly changes the traveling direction, the vehicle control path B2 of the target object Ob is changed accordingly. For this reason, the driver assistance ECU 20 sets the filter characteristics of the vehicle control filter so that the smoothing degree is decreased when the detectable distance is long compared with when the detectable distance is short. Consequently, the filter characteristics are set in a more suitable manner. If the filter characteristics of the vehicle control filter are made weak, the stability deteriorates, and the filtering process becomes more susceptible to the influence of the unwanted reflected waves. However, since the detectable distance is long, the influence is expected to be corrected. Thus, even if the filter characteristics of the vehicle control filter are made weak when the detectable distance is long, the influence of the unwanted reflected waves is reduced.

If the filter characteristics of the vehicle control filter are made strong (if the smoothing degree is great), the stability is improved. For this reason, if the detectable distance is short, the driver assistance ECU 20 sets the filter characteristics of the vehicle control filter so that the smoothing degree is increased to reduce the influence of the unwanted reflected waves and inhibit erroneous detection. Consequently, the filter characteristics is set in a more suitable manner.

Even if the response deteriorates by making the filter characteristics strong, when the detectable distance is greater than or equal to the predetermined distance, the filter characteristics are changed to improve the response. Thus, the vehicle control path B2 is determined with consideration given to the vehicle control position P2 of the target object Ob when the detectable distance is greater than or equal to the predetermined distance. Consequently, even if the filter characteristics of the vehicle control filter are made strong when the detectable distance is less than the predetermined distance, the PCS operation is appropriately executed.

Other Embodiments

The present disclosure is not limited to the above-described embodiment, but may be embodied as follows for example. Identical or the same components in the embodiments are given identical reference numerals, and the descriptions for the components with identical reference numerals are incorporated in the following description.

In the above-described embodiments, the millimeter-wave radar is employed as the search device, but a sonar, which detects and measures the distance to an object (target object) using soundwaves, may be employed.

In the above-described embodiments, the filter characteristics of the collision determination filter may be set to be stronger than the filter characteristics of the vehicle control filter.

The PCSS 100 may be employed for executing the PCS operation with respect to the target object Ob located in front of the own vehicle CS.

The vehicle control path B2 may be estimated if it is determined that there is a possibility of a collision in the collision determination.

In the above-described embodiments, the path of the own vehicle CS is predicted using the steering angle detected by the steering angle sensor 33. However, instead of the steering angle sensor 33, the path of the own vehicle CS may be predicted using a yaw rate sensor based on the yaw rate and the vehicle speed.

In the second embodiment, the filter setting section 28 may set the filter characteristics of the collision determination filter in accordance with the detectable distance. In this case also, the characteristic of the collision determination filter is preferably always weaker (smoothing degree is smaller) than that of the vehicle control filter.

In the second embodiment, the filter setting section 28 may determine the detectable distance in accordance with the distance from the own vehicle CS to the predicted collision point D1.

In the second embodiment, the filter setting section 28 estimates the detectable distance, but may estimate the detectable time. More specifically, after calculating the detectable distance, the filter setting section 28 may estimate the detectable time by dividing the detectable distance by the speed of the target object Ob. In this case, the filter setting section 28 only needs to set the filter characteristics of the vehicle control filter in accordance with the detectable time. For example, the filter setting section 28 may set the filter characteristics of the vehicle control filter depending on whether the detectable time is greater than or equal to a predetermined time. That is, the filter setting section 28 may set the weak filter as the vehicle control filter if the detectable time is greater than or equal to 10 seconds and may set the strong filter as the vehicle control filter if the detectable time is less than 10 seconds.

In the second embodiment, the filter setting section 28 may estimate the distance (inter-vehicle distance) between the own vehicle CS and the target object Ob as the detectable distance. Furthermore, the time obtained by dividing the inter-vehicle distance by the relative speed may be estimated as the detectable time.

In the second embodiment, the filter setting section 28 is configured to be able to set two different filters as the vehicle control filter, but may be configured to be able to set three or more different filters in accordance with the detectable distance.

In the second embodiment, the driver assistance ECU 20 sets the weak filter as the vehicle control filter if the vehicle control path B2 of the target object Ob and the path A1 of the own vehicle CS do not intersect with each other. As a modification, the driver assistance ECU 20 may set the filter characteristics of the vehicle control filter with the distance from the vehicle control position P2 of the target object Ob to the outermost position of the detection range set as the detectable distance. In this case, if the intersection D2 of the vehicle control path B2 and the transmission direction of the search wave that are orthogonal to each other exists within the detection range 31a, the filter setting section 28 may estimate the distance between the vehicle control position P2 and the intersection D2 as the detectable distance.

In the second embodiment, the filter setting section 28 may estimate the detectable distance or the detectable time based on the vehicle control path B2 and the path A1 of the own vehicle CS predicted in the previous cycle. The filter setting section 28 may set the filter characteristics of the vehicle control filter in the current cycle in accordance with the detectable distance or the detectable time that has been estimated. In this case, the driver assistance ECU 20 desirably set the filter characteristics of the vehicle control filter before the radar detection information is acquired in the collision determination process (before step S201).

In the second embodiment, the filter setting section 28 may always estimate the distance E1 from the vehicle control position P2 to the predicted collision point D1 as the detectable distance. That is, even if the predicted collision point D1 exists outside the detection range 31a, or even if the intersection D2 exists in the detection range 31a, the distance E1 from the vehicle control position P2 to the predicted collision point D1 may be estimated as the detectable distance.

Although the present disclosure has been described in accordance with the embodiments, it is understood that the present disclosure is not limited to the embodiments and the structures. The present disclosure embraces various modifications and deformations that come within the range of equivalency. Additionally, various combinations and forms, or other combinations and forms including only one additional element, or other combinations and forms including more or less than one element are included in the scope and technical ideas obtainable from the present disclosure.

The invention claimed is:

1. A collision determination apparatus comprising:
a processor;
a non-transitory computer-readable storage medium; and
a set of computer-executable instructions stored on the non-transitory computer-readable storage medium that cause the processor to:
acquire detection information from a search device, which transmits search waves and receives reflected waves reflected from a target object, the detection information being based on the reflected wave;
filter the detection information;
detect a position of the target object using the filtered detection information;
predict a path of the target object based on changes in the position of the target object detected by the target object information detection section;
predict a path of an own vehicle;

determine a risk of collision between the own vehicle and the target object based on whether the path of the target object and the path of the own vehicle intersect with each other; and for a state in which it is determined that the own vehicle will collide with the target object, estimate a point in time at which the target object will collide with the own vehicle based on the path of the target object and the path of the own vehicle and executes a vehicle control, wherein the path of the target object used to determine the risk of collision is predicted based on the detection information filtered by a collision determination filter, the path of the target object used to estimate a point in time at which the target object will collide with the own vehicle is predicted based on the detection information filtered by a vehicle control filter, wherein filtering by the collision determination filter and the vehicle control filter comprises a smoothing process that inhibits changes in the detection information, and each of the vehicle control filter and the collision determination filter have a different respective smoothing degree of inhibiting the changes in the detection information.

2. The collision determination apparatus according to claim 1, wherein
filter characteristics of the vehicle control filter are set so that the smoothing degree of inhibiting the changes in the detection information is greater than the filter characteristics of the collision determination filter.

3. The collision determination apparatus according to claim 1, wherein the set of computer-executable instructions stored on the non-transitory computer-readable storage medium further cause the processor to
calculate an intersection of the path of the target object and the path of the own vehicle as a predicted collision point and execute vehicle control in accordance with a distance from the own vehicle to the predicted collision point.

4. The collision determination apparatus according to claim 1,
wherein the set of computer-executable instructions stored on the non-transitory computer-readable storage medium further cause the processor to:
set the filter characteristics of the vehicle control filter; and
estimate a detectable time or a detectable distance in which the position of the target object can be detected in the path of the target object based on the position of the target object and a traveling condition of the own vehicle and set the filter characteristics of the vehicle control filter in accordance with the detectable time or the detectable distance that has been estimated.

5. The collision determination apparatus according to claim 1, wherein the set of computer-executable instructions stored on the non-transitory computer-readable storage medium further cause the processor to:
acquire the detection information of the target object at a rear of the own vehicle from the search device; and
predict the path of the own vehicle when the own vehicle moves backward.

6. The collision determination apparatus according to claim 1, wherein the set of computer-executable instructions stored on the non-transitory computer-readable storage medium further cause the processor to:
determine whether the path of the target object predicted based on the detection information filtered by the collision determination filter and the path of the own vehicle intersect;
in response to determining that the path of the target object predicted based on the detection information filtered by the collision determination filter and the path of the own vehicle as a predicted collision point intersect, calculate a predicted collision point at which the path of the target object predicted based on the detection information filtered by the collision determination filter and the path of the own vehicle intersect;
calculate a predicted distance from the own vehicle to the predicted collision point;
determine whether the predicted distance is less than or equal to a threshold distance; and
in response to determining that the predicted distance is less than or equal to the threshold distance, execute vehicle control based the path of the target object predicted based on the detection information filtered by the vehicle control filter.

7. A collision determination method comprising the steps of:
acquiring detection information from a search device, which transmits a search wave and receives a reflected wave reflected off a target object, the detection information being based on the reflected wave;
filtering the detection information;
detecting a position of the target object using the filtered detection information;
predicting a path of the target object based on changes in the detected position of the target object;
predicting a path of an own vehicle;
determining a risk of collision between the own vehicle and the target object based on whether the path of the target object and the path of the own vehicle intersect with each other; and
for a state in which it is determined that the own vehicle will collide with the target object, estimating the point in time at which the target object collides with the own vehicle based on the path of the target object and the path of the own vehicle and executing a vehicle control, wherein
the path of the target object used in a collision determination is predicted based on the detection information filtered by a collision determination filter,
the path of the target object used in a vehicle control is predicted based on the detection information filtered by a vehicle control filter,
is filtering by the collision determination filter and the vehicle control filter comprises a smoothing process of inhibiting changes in the detection information, and
the vehicle control filter and the collision determination filter have different respective smoothing degrees of inhibiting the changes in the detection information.

* * * * *